Feb. 13, 1962 M. WARANCH 3,021,094
STRAND DISPENSING AND BINDING TOOL
Filed Feb. 26, 1958

INVENTOR.
Myer Waranch

United States Patent Office 3,021,094
Patented Feb. 13, 1962

3,021,094
STRAND DISPENSING AND BINDING TOOL
Myer Waranch, 2919 Rosalind Ave., Baltimore, Md.
Filed Feb. 26, 1958, Ser. No. 717,734
4 Claims. (Cl. 242—137.1)

This invention relates to tying, knotting, binding, or lacing, more specifically, to a novel tool which greatly facilitates hand lacing or binding of wire conductor strands to form cables or wire harnesses.

In the currently used method of binding of individual strands of wire conductors to form hand sewn or laced cables or wire harnesses, there is no tool used. Lacing of wires is now done as follows: A length of lacing twine is cut from a rather large spool of lacing twine. This length of twine is then used to bind the wire conductors into a rather rigid hand-laced cable or harness by forming a series of tightly drawn connected knots. The process of forming one of these knots consists basically of passing the twine around the bundle of wire, then through a previously formed loop, and then pulling the loop taut to form a knot. This is a slow and tedious process since in the formation of a loop the entire remaining length of twine must be passed through the loop before pulling it taut.

When the length of cable run is long it becomes very impractical to thread long lengths of twine through the loops. The long runs are then broken up into several smaller sections by using shorter lengths of twine which, although somewhat more convenient to handle, detract from the appearance of the job. Another limitation to the present art of cable lacing is that it is necessary to wear special protectors to guard against cutting of the hands by the twine when drawing the knots tight.

With the invention described herein these and other limitations of the prior art are overcome. Some of the prime objects of this invention are to attain faster, neater, and continuous lacing of bundles of strands such as wire conductors.

Other objects of this invention are to eliminate the need for hand protectors and to reduce operator fatigue.

Still other objects of this invention are to provide an easily handled twine dispensing and lacing tool and to provide a tool with a simple and adjustable tensioning device and a quickly operated reel brake.

Still further objects of this invention are to keep the twine clean, to allow fast insertion of a new reel of sttrands, and to provide a twine dispensing and lacing tool of simple, sturdy and reliable construction.

These and other objects and many advantages of the invention will be apparent from the following description considered with the accompanying drawings.

Figure 1:
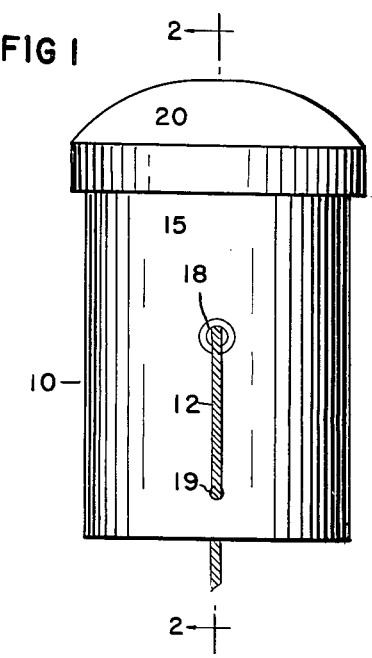
FIG. 1 is a front elevation view of an embodiment of the strand dispensing and binding tool.
Figure 2:
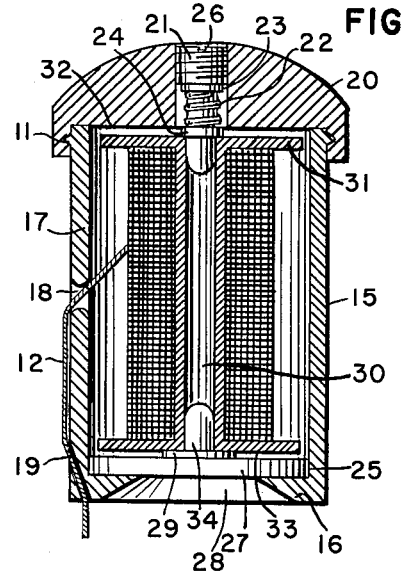
FIG. 2 is a vertical section taken on the line 2—2 of FIG. 1.

With reference to the embodiment of the invention shown in FIGS. 1, 2, 3, and 4 the entire tool is identified by reference number 10. The component parts are: housing 15, end cap 20, slidable spindle 25, tension adjusting screw 21, spring 22, washers 23 and 24, and reel 30.

Housing 15 is in the form of a cylinder with the top end completely open but provided with threads 11 so that this end may be closed by the mating threads of end cap 20. The bottom end of housing 15 is a beveled annular ring or rim 16 which is preferably an integral part of the housing. In the wall 17 of the housing is rounded opening 18 with another opening 19 at the bottom of the housing and in line with opening 18. These openings provide means for feeding out strand 12 of reel 30 from the bottom of the housing. End cap 20, which is preferably rounded, contains a threaded opening 26 which accommodates tension adjusting screw 21. Screw 21 also functions as a spindle and as a holder for spring 22 and washers 23 and 24.

Reel 30 is supported and kept in alinement by slidable spindle 25 and by screw 21. Resistance of the reel to rotation is varied by screw 21 whose setting determines the amount of compression of spring 22 and hence the force exerted against reel 30. This resistance should not be excessive but should be great enough to prevent unreeling of strands within the housing when the speed of paying out strands is suddenly changed. Adjustment of spring tension is desirable in order to compensate for dimensional tolerances of parts and operators' preferences.

Disk 27 of slidable spindle 25, with a diameter almost equal to the inside diameter of housing 15, normally rests against annular rim 16 due to the pressure exerted on it by spring 22 through washer 24 and reel 30. Slidable spindle 25 is in contact with reel flange 33 through its smaller diameter portion 29. The core of reel 30 is supported by the smallest diameter portion 34 of spindle 25. Spindle 25 is subject to movement towards end cap 20 by exerting force on the face of disk 27 through the opening 28 formed by annular rim 16. This force is normally exerted by the thumb of the operator when he desires to completely prevent rotation of the reel. With sufficient force exerted against the disk 27 of slidable spindle 25, reel flange 31 is forced into contact with face 32 of end cap 20. The braking action on the reel is then so great that even though great pull is made upon strand 12, no rotation of reel 30 results. This type of braking action is very desirable since this feature permits knots to be tightened without undue strain or discomfort to the operator.

Figure 3:
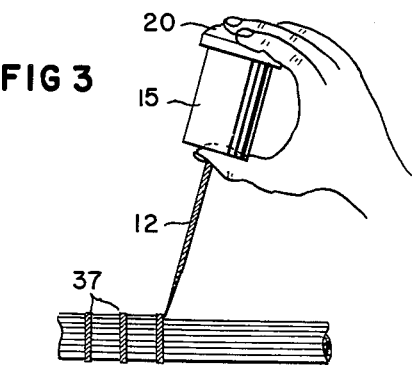
FIG. 3 illustrates a side elevation view of a cable lacing step wherein the tool has been used to pull a loop of lacing twine taut to form a secure knot.
Figure 4:
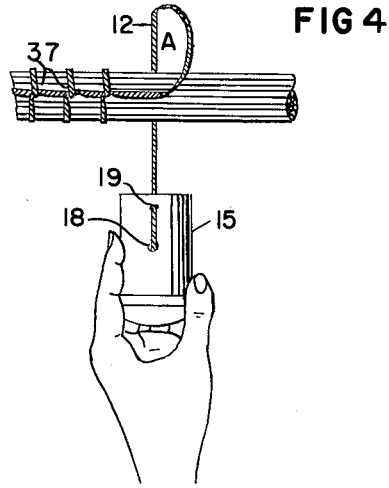
FIG. 4 illustrates a plan view of another step in lacing the cable during which step a loop has been formed.

FIGS. 3 and 4 illustrate the use of this tool for the purpose of binding a bundle of wires to form a laced cable or harness. FIG. 3, a side elevation view, shows use of the tool in the process of tightening a knot. The hand is shown comfortably gripping the tool and simultaneously pulling the strand taut since the thumb is exerting pressure on the disk 27 of slidable spindle 25 and thereby preventing unreeling of the strand as explained above. The rounded end cap 20 provides a comfortable gripping surface for the fingers while the overall dimensions of the tool are such as to permit the device to be easily held between the fingers and thumb.

FIG. 4, a plan view, shows a following step which is forming the loop for the next knot. During this step the strand is supported by the right hand while the tool is lowered below the cable level to form the loop A. As the loop A is supported by the right hand, which for the sake of clarity is not shown in the figure, the tool is pulled from beneath the bundle of wires by the left hand. This is done in one continuous motion and results in the strand feeding out smoothly from the tool. With an upward movement of the left hand the tool is pushed through loop A, grasped by the right hand, and pulled up to tighten the loop as shown in FIG. 3. These above described steps are repetitive until the lacing job is finished. The rounded end cap 20 and the smooth symmetrical surface of the tool allow the device to slip through the loop without snagging. In FIG. 4 can be seen typical completed knots 37. Other kinds of knots can also be made by using this tool.

Figure 5:
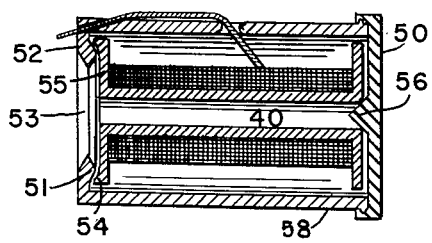
FIG. 5 is a sectional view of another embodiment of the invention.

A simplified embodiment of this invention is shown in a sectional view in FIG. 5 where reel 40 is shown supported at one end by protuberance 56 of end cap 50 and supported at the other end by annular projection 51 of annular rim 52 of housing 58. Rim 54 of reel flange 55 rests on annular projection 51. Reel rotational resistance is regulated by the degree of tightening of end cap 50. Braking action of the reel can be performed by exerting force on the reel through opening 53 in the rear of the tool in a manner similar to that described in the other embodiment of the tool. In this simplified embodiment the rim 52 can be fashioned similar to rim 16 of the first embodiment, or it can be made in the form of split sections, lips, protuberances or other shapes without departing from the spirit of this invention. Annular rim 16 of the previous embodiment can also be made in other forms. Also reel flange 55 could be similar to reel flange 31 of the other embodiment. In the simplified embodiments of this invention there is a tendency for the reel to bind, particularly with the larger size reels. In the smaller sizes of these simplified embodiments, performance is more satisfactory since the binding frictions are less.

Use of this invention greatly simplifies binding and tying operations and saves much labor and time since laborious threading of long strands through many knots is now eliminated. This invention makes practical continuous lacing of long runs of wire harnesses or cables. Also there result neater lacing jobs. Operator fatigue is greatly reduced due to the easy and comfortable gripping of the tool and the natural motions that follow from its handling. Also the operator can now dispose of the clumsy work-impeding hand protectors which have been used to prevent injury to the hands when pulling knots tight. In addition, the lacing material is kept clean and protected at all times since actual touching of the twine is minimized and also since twine cannot drag on the floor.

While but two forms of the invention are shown in the drawings and described in the specification, it is not desired to limit this application for patent to these particular forms as it is appreciated that other forms could be made that would use the same principles and come within the scope of the appended claims.

What is claimed as new is:

1. A strand dispensing and binding tool, comprising a substantially cylindrical casing, the said casing having a top end and a bottom end, a cover for the said top end of the said casing the bottom end of the said casing having an annular rim integrally mounted on the inside diameter of the said casing and forming an opening in the said bottom of the said casing, a reel within the said casing, the said reel being a container for binding material, a first reel support mounted in the said cover of the said casing, the said first reel support rotatably and slidably supporting one end of the said reel, a second reel support in the said bottom end of the said casing, the said second reel support rotatably and slidably supporting the other end of the said reel, the said second reel support retained within the said bottom end of the said casing by the said annular rim of the said cylindrical casing, the said cylindrical casing having guiding and aligning portions for slidably receiving the said binding material from the reel and dispensing the said binding material from within the said annular rim in the said bottom end of the said cylindrical casing.

2. An arrangement as set forth in claim 1, further provided with guiding and aligning means for the said binding material, the said cylindrical casing having a first hole therethrough intermediately located between the said top and bottom ends of the said casing, the said cylindrical casing having a second hole, the said second hole originating near the said bottom end of the said casing and emerging from within the said annular rim in the said bottom end of the said casing.

3. A strand dispensing and binding tool comprising a substantially cyilndrical casing, the said casing having a top end and a bottom end, a cover for the said top end of the said casing, the bottom end of the said casing having an annular rim integrally mounted on the inside diameter of the said casing and forming an opening in the said bottom end of the said casing, a reel within the said casing, a first reel support mounted in the said cover of the said casing, the said first reel support rotatably and slidably supporting one end of the said reel, means in the said cover for adjustably and tensionally moving the said first reel support in the longitudinal axis of the said cylindrical casing, a second reel support in the said bottom end of the said casing, the said second reel support rotatably and slidably supporting the other end of the said reel, the said second reel support retained within the said bottom end of the said casing by the said annular rim of the said cylindrical casing, a disk member and a stud, the said stud projecting from the center of the said disk member and serving as the second reel support, the said disk member being of greater diameter than the said opening formed by the said annular rim, the second reel support being conditioned to be movable parallel to the longitudinal axis of the said cylindrical casing and substantially immovable perpendicularly to the longitudinal axis of the said cylindrical casing.

4. A strand dispensing and binding tool comprising a substantially cylindrical casing, the said casing having a top end and a bottom end, a cover for the said top end of the said casing, the bottom end of the said casing having an annular rim integrally mounted on inside diameter of the said casing and forming an opening in the said bottom of the said casing, a reel within the said casing, a stud projecting through the said cover and serving as one reel support, the said stud adjustably fixed in the longitudinal axis of the said casing and rotatably and slidably supporting one end of the said reel, on the said stud a spring, the said spring tensionally separating the said one end of the said reel from the said cover, the said cover having a recessed portion in the center thereof, the said recessed portion adjacent to the said spring, the said spring arranged to compressionally withdraw into the said recessed portion and permit frictional binding of the said one end of the said reel against the said cover when manual pressure is applied to the said other end of the said reel, a second reel support in the said bottom end of the said casing, the said second reel support rotatably and slidably supporting the said other end of the said reel, the said second reel support retained within the bottom end of the said casing by the said annular rim.

References Cited in the file of this patent
UNITED STATES PATENTS

| | | |
|---|---|---|
| 250,216 | Dimock | Nov. 29, 1881 |
| 319,448 | Brown | June 9, 1885 |
| 2,340,184 | Gray | Jan. 25, 1944 |
| 2,630,981 | Strocco | Mar. 10, 1953 |